United States Patent [19]

Brightwell

[11] Patent Number: 5,265,103
[45] Date of Patent: Nov. 23, 1993

[54] DATA COMMUNICATIONS SYSTEM

[75] Inventor: Andrew E. Brightwell, Longdendale, United Kingdom

[73] Assignee: International Computers Limited, London, England

[21] Appl. No.: 625,118

[22] Filed: Dec. 10, 1990

[30] Foreign Application Priority Data

Dec. 20, 1989 [GB] United Kingdom ................ 8928699

[51] Int. Cl.$^5$ .............................................. G08C 25/02
[52] U.S. Cl. ........................................ 371/32; 371/33; 370/85.1; 370/94.3
[58] Field of Search ................. 371/32, 33, 67.1, 68.2; 340/825.06; 350/96.2, 96.15; 370/85.1, 94.3

[56] References Cited

U.S. PATENT DOCUMENTS

| | | | |
|---|---|---|---|
| 4,562,539 | 12/1985 | Vince | 395/200 |
| 4,726,027 | 2/1988 | Nakmura et al. | 371/32 |
| 4,781,427 | 11/1988 | Husbands et al. | 350/96.16 |
| 5,081,623 | 1/1992 | Ainscow | 370/85.4 |
| 5,109,384 | 4/1992 | Tseung | 371/32 |
| 5,161,153 | 11/1992 | Westmore | 370/94.3 |

FOREIGN PATENT DOCUMENTS 0054118  6/1982  European Pat. Off. .

OTHER PUBLICATIONS

Goodman, "Multiwavelength Networks and New Approaches to Packet Switching", IEEE Communications Magazine, Oct. 1989, pp. 27-35.

Primary Examiner—Robert W. Beausoliel, Jr.
Assistant Examiner—Ly V. Hua
Attorney, Agent, or Firm—Lee, Mann, Smith, McWilliams, Sweeney & Ohlson

[57] ABSTRACT

A data communications system comprises a number of interconnected nodes. Messages from the nodes are grouped into frames, and the frames are delivered to all the nodes in the same sequence.

Whenever a transmission error is detected, all the nodes co-operate to replay the sequence of frames from a particular point which is at least far enough back to ensure retransmission of the earliest frame that could have been in error. Each node then discards all repeated frames that it has already correctly received.

6 Claims, 2 Drawing Sheets

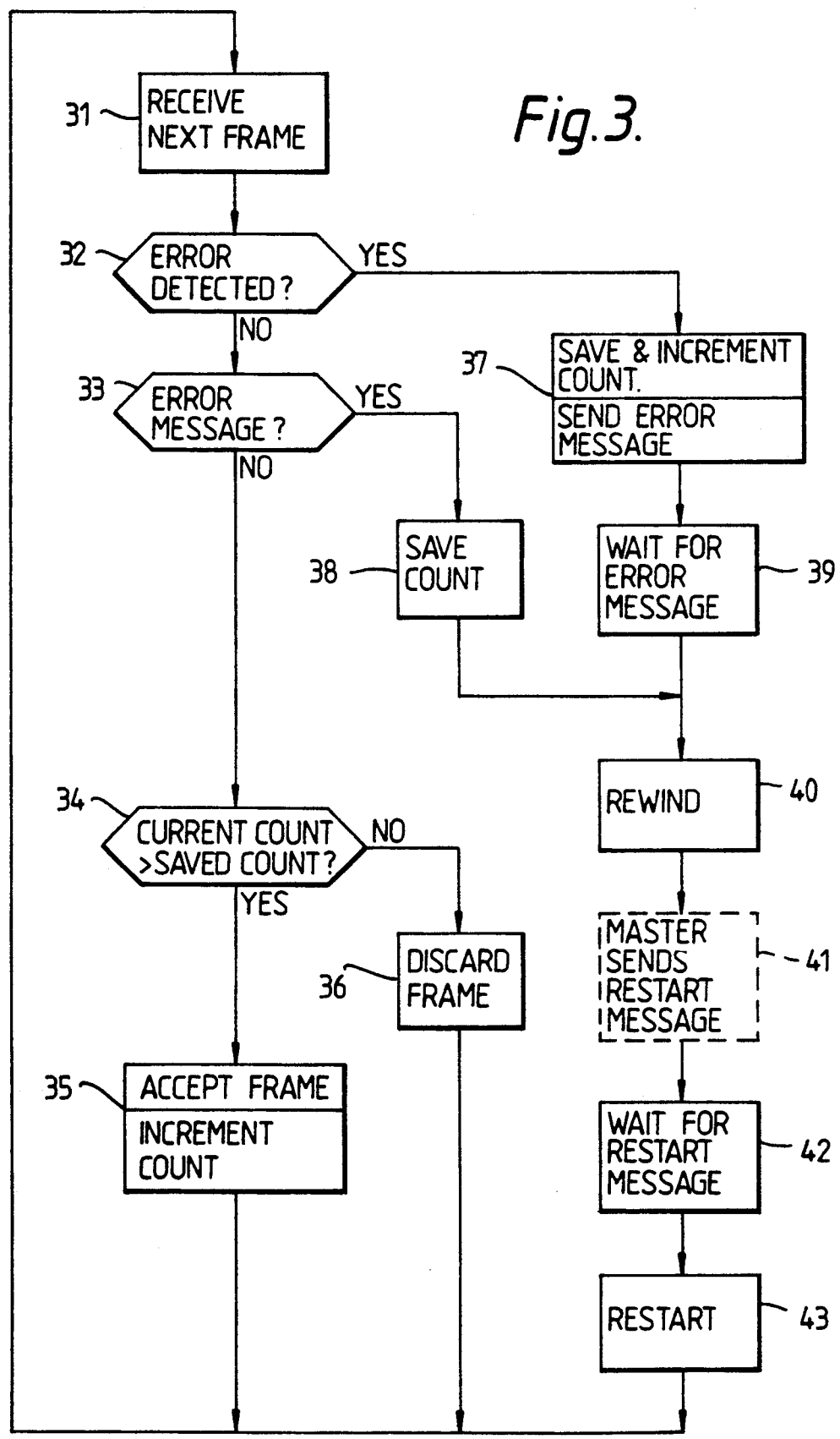

DATA COMMUNICATIONS SYSTEM

BACKGROUND TO THE INVENTION

This invention relates to data communications systems.

U.S. Pat. No. 5,161,153 (Westmore-1) describes a data communications system comprising a plurality of interconnected nodes, in which each node broadcasts a sequence of messages to all the nodes, including itself. The messages are grouped into frames, each frame comprising one message from each node, and the frames are delivered to all the nodes in the same sequence.

Such a communications system can be used, for example, for co-ordinating the updating of local memories in a number of processing nodes, to ensure that each memory receives update messages in the same globally unique sequence, so that a consistent chronology of updates is maintained. This updating method is described in U.S. Pat. No. 4,562,539 (Vince).

In such a system, the problem arises of how to handle errors in transmission, and in particular how to recover from these errors while maintaining the required global ordering of the frames. The object of the invention is to solve this problem.

One known method of recovery from transmission errors is a "go-back-N" automatic repeat request system as described in EP 54,118, in which, when an error is detected, the transmitter goes back and retransmits the last N data blocks.

However, this prior proposal was concerned only with a point-to-point system involving a single transmitter and a single receiver. It is not immediately apparent how this proposal could be applied to a multi-node broadcast system, as described above, in such a way as to preserve the consistency of the chronology of the messages in all the nodes.

SUMMARY OF THE INVENTION

According to the invention there is provided a data communications system comprising a plurality of interconnected nodes, wherein (a) each node broadcasts a sequence of messages to all the nodes including itself, (b) the messages are grouped into frames, each frame comprising one message from each node, and the frames are delivered to all the nodes in the same sequence, (c) whenever a transmission error is detected, the sequence of frames is rewound and replayed, the amount by which the sequence is rewound being at least sufficient to ensure retransmission of the earliest frame that could have given rise to the detected error, and (d) each node discards all repeated frames that have already been correctly received by that node.

It can be seen that instead of simply repeating the sequence of messages from the node that generated the faulty message, the overall sequence of frames is repeated, involving retransmission by all the nodes. This ensures that the correct chronology of messages is maintained.

BRIEF DESCRIPTION OF THE DRAWINGS

FIG. 3 is a flow chart showing the operation of the interface unit.

DESCRIPTION OF AN EMBODIMENT OF THE INVENTION

Figure 1:
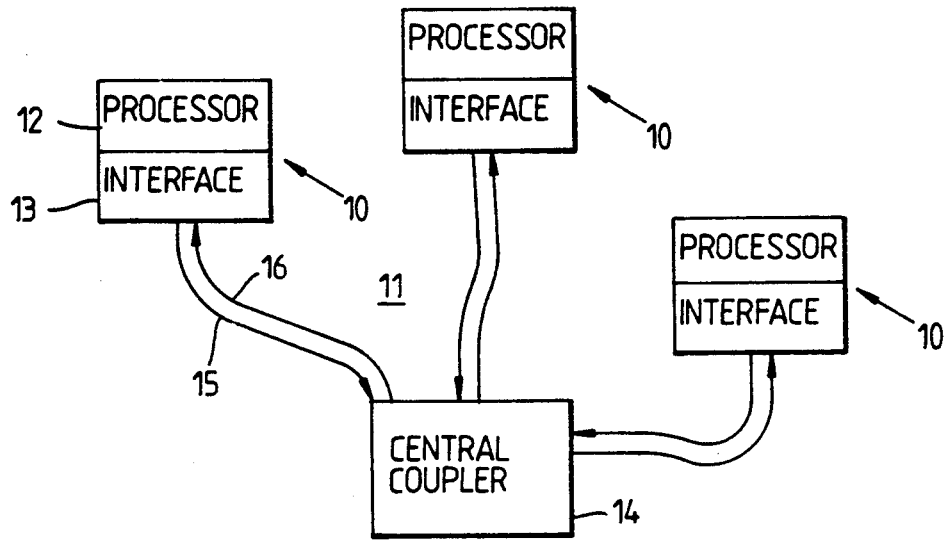
FIG. 1 is an overall view of a data processing system comprising a plurality of nodes.

One data processing system embodying a data communications system in accordance with the invention will now be described by way of example with reference to the accompanying drawings. Referring to FIG. 1, the data processing system comprises a plurality of processing nodes 10 interconnected by a network 11. Each node comprises a processing unit 12, and an interface unit 13 which connects the processing unit to the network. The network comprises a central coupler 14 and a plurality of optical cables connecting the coupler to the nodes. Each cable comprises a first optical fiber 15 for carrying optical signals from a node to the central coupler, and a second optical fiber 16 for carrying optical signals from the central coupler to the node.

The central coupler 14 is a passive optical star coupler which receives signals from each incoming fiber 15 and couples them on to all the outgoing fibers 16. Hence, signals transmitted from each node are propagated to all the nodes, including the source node.

Figure 2:
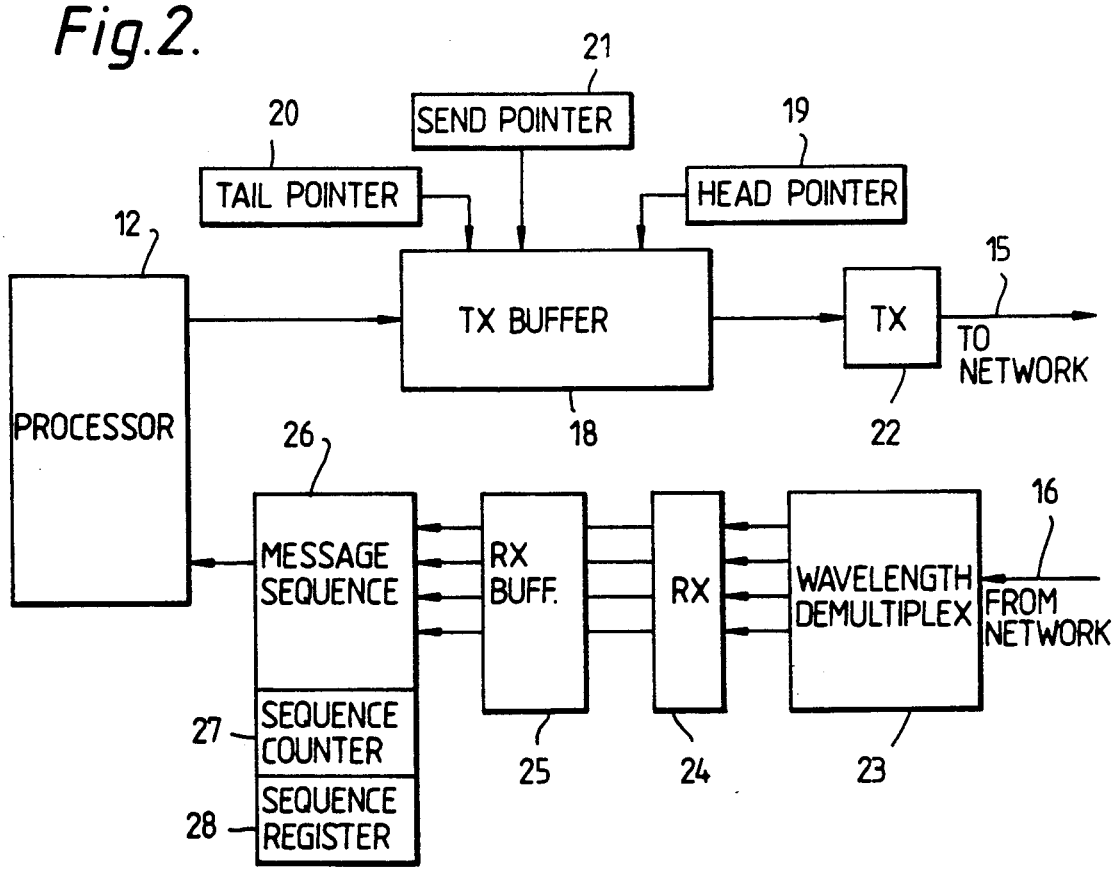
FIG. 2 shows an interface unit forming part of one of the nodes.

Referring now to FIG. 2, this shows one of the interface units 13 in more detail.

The interface unit receives data from the associated processor 12 in the form of a sequence of fixed-length messages. These messages are written into a transmit buffer 18, which holds a queue of messages either waiting to be transmitted or which have been sent but are being preserved in case it is required to retransmit them.

The buffer 18 has three pointers associated with it, as follows:

Head pointer 19. This indicates the head of the message queue, i.e. the oldest message currently in the queue. This is the oldest message that may have to be re-transmitted for error recovery. Tail pointer 20. This points to the tail of the queue, i.e. to the first free message slot. When a message is passed to the buffer, it is written into this slot, and the tail pointer is then incremented (i.e. moved to the left as viewed in this Figure) so as to point to the next free message slot.

Send pointer 21. This points to the next message to be transmitted. When the node is ready to transmit, it reads a message out of the slot indicated by the send pointer. The send pointer is then incremented to point to the next message in the queue.

Messages read out of the transmit buffer 18 are fed to an optical transmitter 22 which adds control information, including acknowledgement bits for acknowledging the receipt of previous messages. The transmitter modulates the data on to an optical carrier of predetermined wavelength, and transmits it over the optical fiber 15 to the central coupler. Each node transmits on a different optical wavelength, so that the messages from the different nodes are wave-division multiplexed.

The node receives the multiplexed optical signals from the central coupler over the optical fiber 16. These signals are fed to a wavelength demultiplexer 23, which divides the signals into a plurality of channels according to their wavelengths. Thus, it can be seen that the demultiplexer 23 separates out the signals from the different source nodes. Typically, the demultiplexer 23 comprises a diffraction grating and lens to direct the signals of different wavelengths on to separate optical sensors.

The output channels from the demultiplexer 23 are fed to an array of optical receivers 24, one for each channel, and these demodulate the data to produce electrical signals. The outputs of the receivers 24 are fed to a set of receive buffers 25, one for each channel.

As will be described, the messages from all the nodes are aligned with each other, so that a set of messages, one from each node, is written into the receive buffers 25 synchronously in parallel. Each set of aligned messages is referred to herein as a frame. Each node receives the frames in the same sequence as all the other nodes.

A message sequencer circuit 26 selects messages from the buffers 25 in a predetermined order, (the same for all nodes), and passes them to the associated processor. It can be seen that since the frames are received in the same order by all the nodes, and since the messages within each frame are selected in the same order, the overall result is that each node organises the messages into a globally unique order, the same for all nodes.

A frame sequence counter 27 counts the received frames, so as to assign a sequence number to each frame. The sequence counters in all the nodes are all synchronised so that each allocates the same sequence number to any given frame. The current value of the sequence counter can be saved in a sequence register 28.

OPERATION

When the system is initially switched on, all the nodes start to transmit idle messages. One of the nodes (e.g. node 1) is designated as a master node, and each of the other nodes adjusts its message timing at the transmitter 22, so that its returning messages are aligned at the receiver 24 with those from the master node. This ensures the correct alignment of messages within a frame.

Each node then determines its own distance from the central coupler, by observing the time taken for a message to travel the round-trip from the node to the central coupler and back. It is assumed in this example that this round-trip time is equal to an integral number of frame times. Each node then sends a message to all the other nodes, informing them of the measured distance. In this way, each node builds up a table showing the distance of each node from the central coupler.

The master node then sends a START message to all the nodes (and to itself), and each node, when it receives this message, starts normal transmission of messages from its transmit buffer.

Referring now to FIG. 3, this shows the operation of the system following this initial phase.

(31) The node receives the next frame into the receive buffers 25.

(32) The node checks whether there are any errors in any of the messages in the frame. An error may be detected by a parity check, or by failure to receive an expected acknowledgement to an earlier message.

(33) If the error check indicates that no errors have occurred, the node examines the frame to determine whether it contains an ERROR message from another node.

(34) If there is no ERROR message, the node compares the current value of the sequence counter 27 with the saved count value (if any) in the sequence register 28.

(35) Assuming that the current value is greater than the saved value, the frame is accepted and passed to the processor 12. The sequence counter 27 is then incremented. At the same time, the head pointer 19 of the transmit buffer is incremented (i.e. moved one slot to the left), so as to discard the message at the head of the queue, which is now no longer required. The sequence then returns to box 31 for reception of the next new frame.

Thus, in normal error-free operation, the node repeatedly perform this loop through the boxes 31–35, so as to accept successive frames, incrementing the sequence counter for each frame.

(36) If the current value of the sequence counter 27 is found to be smaller than or equal to the saved value in the sequence register 28, the frame is discarded and the sequence counter 27 is incremented. As will become apparent, this ensures that each node discards any frames that it has already received correctly.

(37) If an error is detected at box 32, the current contents of the sequence counter 27 are saved in the sequence register 28, so as to preserve the sequence count of the last correctly received frame. The sequence counter is then incremented. The node then sends an ERROR message to all the other nodes, and to itself.

(38) When the ERROR message is detected at another node, at box 33, that other node saves its current sequence counter contents, so as to remember the sequence count of its last correctly received frame.

(39) After a node has sent an ERROR message, it continues to receive subsequent frames, incrementing the sequence counter for each frame, until an ERROR message is received back. This may be the ERROR message generated by this node. Alternatively, it may be from another node, if that other node has also detected an error before it received the ERROR message from this node.

(40) Following box 38 or 39, the node rewinds its transmission sequence to a pre-arranged point, sufficiently far back to ensure that the oldest message in the system which could have produced the error will be retransmitted. Rewinding the transmission sequence involves moving the send pointer of the transmission buffer backwards (i.e. to the right as viewed in FIG. 2) by a predetermined amount, and decrementing the sequence counter by a predetermined amount. In this example, the send pointer is rewound by an amount equal to 2 (DMAX+D)+DE, where D is the distance of this node from the central coupler (measured in frame times), DMAX is the distance of the furthest node from the central coupler, and DE is the delay between detecting an error and sending the ERROR message. The sequence counter is rewound by 2DMAX.

(41) The master node then transmits a RESTART message.

(42) Each node (including the master) then waits to receive the RESTART message back from the central coupler.

(43) When the RESTART message is received, each node then restarts transmitting messages after a predetermined delay. This delay is different for each node, and depends on the distance of the node from the central coupler, such as to ensure that the messages from all the nodes are correctly synchronised in frames. The node then restarts receiving frames (i.e. returns to box 31) after a second predetermined delay dependent on the distance of the node from the central coupler, to allow for the time taken for the frames to propagate through the network.

EXAMPLE OF OPERATION

An example of the operation of the system will now be given with reference to the following Table 1.

It is assumed in this example that there are three nodes, N1, N2, and N3 in the system, and that the distances of these three nodes from the central coupler are respectively 1, 2 and 3 frame times. Thus, it can be seen, for example, that a message from N1 will arrive back at N1 after 2 frame times, and will take 3 and 4 frame times to reach nodes N2 and N3.

In the table below, the column headed "time" indicates an arbitrary scale, in frame times. The next three columns show the frame numbers of the messages transmitted from the three nodes, and the last three columns show the received frame numbers.

TABLE 1

| TIME | TRANSMITTED | | | RECEIVED FRAME | | |
|---|---|---|---|---|---|---|
| | N1 | N2 | N3 | N1 | N2 | N3 |
| 1 | 57 | 58 | 59 | 55 | 54 | 53 |
| 2 | 58 | 59 | 60 | 56 | 55 | 54 (ERROR) |
| 3 | 59 | 60 | E | 57 | 56 | 55 |
| 4 | 60 | 61 | | 58 | 57 | 56 |
| 5 | 61 | 62 | | 59 | 58 | 57 |
| 6 | 62 | 63 | | 60 | 59 | 58 |
| 7 | 63 | 64 | | E | 60 | 59 |
| 8 | R | 65 | | | E | 60 |
| 9 | | | | | | E |
| 10 | | | | R | | |
| 11 | | | | | R | |
| 12 | | | | | | R |
| 13 | | | 54 | | | |
| 14 | | 54 | 55 | | | |
| 15 | 54 | 55 | 56 | | | |
| 16 | 55 | 56 | 57 | | | |
| 17 | 56 | 57 | 58 | 54 | | |
| 18 | 57 | 58 | 59 | 55 | 54 | |
| 19 | | | | 56 | 55 | 54 |
| 20 | | | | 57 | 56 | 55 |
| 21 | | | | 58 | 57 | 56 |
| 22 | | | | 59 | 58 | 57 |
| 23 | | | | 60 | 59 | 58 |
| 24 | | | | 61 | 60 | 59 |
| 25 | | | | 62 | 61 | 60 |

In this example, it is assumed that at time 2 the node N2 detects an error in frame 54. It therefore saves the frame sequence count 53, i.e. the last correct frame received.

At time 3, node N3 sends an ERROR message to all the other nodes. This arrives at nodes N1, N2 and N3 at times 7, 8 and 9 respectively. Nodes N1 and N2 each save the sequence count 60.

When they receive the ERROR message, the three nodes wind back their send pointers by 9, 11 and 13 messages respectively, so that they now all point to frame 54. Similarly, all three nodes wind back their sequence counters by 6, to the value 54.

At time 8 the master node N1 sends a RESTART message to all the other nodes. This is received by nodes N1, N2 and N3 at times 10, 11 and 12 respectively.

When each node receives the RESTART message, it restarts transmitting and then restarts receiving, after delays dependent on the distances of the nodes from the central coupler, so as to recreate the original sequence of frames as shown.

Since nodes N1 and N2 have both saved the sequence count value 60, they both discard the received frames 54–60. However, since node N3 saved the count value 53, it starts accepting frames immediately, from frame 54. Thus, it can be seen that, after restart, each node discards any frames that it has already received correctly, and then continues accepting frames at the point where it was interrupted by the error. Thus, recovery from the error is achieved while still maintaining the correct sequence of frames.

It should be noted that the system described will also cope correctly with the situation where a second error is detected by another node before it has received the ERROR message from the first node. In this case, the first of the ERROR messages to be received by the nodes will have priority, and will cause the sequence to be wound back so as to ensure retransmission of both frames in which errors were detected.

SOME POSSIBLE MODIFICATIONS

It will be appreciated that many modifications can be made to the system as described above without departing from the scope of the present invention.

For example, instead of using the same transmission network for error recovery, the system may switch to an alternative network to retransmit the messages.

The amount by which the transmission sequence is wound back may be greater than the minimum amount necessary to ensure retransmission of the frame in which the error occurred. Since errors are normally a rare occurrence, the extra time required for recovery is not significant.

The transmission sequence may be wound back by a fixed amount, determined by the network parameters. Alternatively, the amount by which the sequence is wound back may be agreed dynamically between the nodes.

For greater system integrity, the sequence counts may be transmitted over the network along with the messages they refer to. Alternatively, only the low-order end of the sequence count might be sent with each message.

It will be understood that whilst the error recovery technique described above is of particular advantage for optical networks, it may also be employed in non-optical systems.

I claim:

1. A data communication system comprising:
   (a) a plurality of nodes, each node comprising means for transmitting a sequence of messages, and
   (b) an interconnection network connected to said nodes, for receiving said messages from the nodes, grouping said messages into a sequence of frames, each frame comprising one message from each node, and delivering said sequence of frames to all the nodes in successive frame time periods,
   (c) said interconnection network comprising a central coupler, and a plurality of branches connecting said central coupler to said nodes, said nodes being at differing distances along said branches from said central coupler,
   (d) each said node comprising means for detecting transmission errors in the messages in said frames received by the node from the network, and operative upon detection of a transmission error, for sending an error message over said network,
   (e) and each node also comprising means responsive to receipt of said error message from the network, for causing the node to rewind the sequence of messages transmitted by the node by an amount proportional to the distance of that node from the central coupler.

2. A system according to claim 1 wherein said amount is equal to 2(DMAX+D)+DE, where D is the distance of the node from said central coupler, DMAX is the distance of a furthest node from said central coupler and DE is a constant value (D, DMAX and DE being measured in frame time periods).

3. A system according to claim 1 wherein one of said nodes includes means for sending a restart message over said network to all said nodes, and each of said nodes includes means for restarting transmission of said sequence of messages upon receipt of said restart message from the network.

4. In a data communication system comprising:
  (i) a plurality of nodes, and
  (ii) an interconnection network comprising a central coupler, and a plurality of branches connecting said central coupler to said nodes, said nodes being at differing distances along said branches from said central coupler,
a method comprising the steps:
  (a) transmitting a sequence of messages from each node over the network,
  (b) grouping said messages in the network into a sequence of frames, each frame comprising one message from each node, and delivering said sequence of frames to all the nodes in successive frame time periods,
  (c) detecting transmission errors in the messages in said frames received by a node from the network, and sending an error message from that node over said network, and
  (d) when said error message is received from the network by each node, rewinding the sequence of messages transmitted by that node by an amount proportional to the distance of that node from the central coupler.

5. A method according to claim 4 wherein said amount is equal to 2(DMAX+D)+DE, where D is the distance of the node from said central coupler, DMAX is the distance of a furthest node from said central coupler and DE is a constant value (D, DMAX and DE being measured in frame time periods).

6. A method according to claim 4 including the further steps of sending a restart message over said network from one of said nodes to all the nodes, and restarting transmission of messages from each node upon receipt of said restart message from the network.

* * * * *